US00RE50156E

(19) United States
(12) Reissued Patent
Yeo et al.

(10) Patent Number: US RE50,156 E
(45) Date of Reissued Patent: Oct. 1, 2024

(54) WIRELESS POWER TRANSMITTING APPARATUS, WIRELESS POWER RECEIVING APPARATUS, AND CIRCUIT FOR CORRECTING DIFFERENTIAL SIGNAL

(71) Applicant: SAMSUNG ELECTRONICS CO., LTD., Suwon-si (KR)

(72) Inventors: Sung-Ku Yeo, Suwon-si (KR); Do-Won Kim, Suwon-si (KR); Dong-Zo Kim, Yongin-si (KR); Bong-Chul Kim, Seoul (KR); Hyung-Koo Chung, Suwon-si (KR)

(73) Assignee: SAMSUNG ELECTRONICS CO., LTD., Suwon-si (KR)

(21) Appl. No.: 17/022,016

(22) Filed: Sep. 15, 2020

Related U.S. Patent Documents

Reissue of:
(64) Patent No.: 10,411,513
Issued: Sep. 10, 2019
Appl. No.: 15/137,591
Filed: Apr. 25, 2016

(30) Foreign Application Priority Data

Sep. 18, 2015 (KR) ..... 10-2015-0132655

(51) Int. Cl.
*H02J 50/12* (2016.01)
*G06F 1/16* (2006.01)
(Continued)

(52) U.S. Cl.
CPC ..... *G06F 3/0383* (2013.01); *G06F 1/1601* (2013.01); *G06F 3/03543* (2013.01)

(58) Field of Classification Search
CPC ..... H02J 50/12; H02J 50/80; H02J 7/025
See application file for complete search history.

(56) References Cited

U.S. PATENT DOCUMENTS

2008/0197712 A1* 8/2008 Jin ..... H02J 50/80 307/104
2012/0306284 A1* 12/2012 Lee ..... H02J 50/40 307/104

(Continued)

FOREIGN PATENT DOCUMENTS

JP 2002-353788 A 12/2002
JP 4123508 B2 5/2008

(Continued)

OTHER PUBLICATIONS

Written Decision on Registration dated Nov. 23, 2022 in counterpart Korean Patent Application No. 10-2015-0132655 and English-language translation.

(Continued)

*Primary Examiner* — Linh M Nguyen
(74) *Attorney, Agent, or Firm* — Nixon & Vanderhye, P.C.

(57) ABSTRACT

A wireless power transmitting apparatus wirelessly charging a wireless power receiving apparatus is provided. The wireless power transmitting apparatus includes a power providing unit configured to provide power, a gate driver configured to generate a differential signal formed of a first signal and a second signal from the power provided from the power providing unit, an amplifier configured to amplify the differential signal by a predetermined gain, a power transmitting unit configured to transmit the amplified differential signal to the wireless power receiving apparatus, and a differential signal correcting circuit that is disposed between the gate driver and the amplifier and is configured to correct the differential signal so that a predetermined phase difference between the first signal and the second signal is maintained.

15 Claims, 12 Drawing Sheets

(51) Int. Cl.

| | |
|---|---|
| ***G06F 3/0354*** | (2013.01) |
| ***G06F 3/038*** | (2013.01) |
| ***H02J 7/02*** | (2016.01) |
| ***H02J 50/70*** | (2016.01) |
| ***H02J 50/80*** | (2016.01) |

(56) References Cited

U.S. PATENT DOCUMENTS

| | | | | |
|---|---|---|---|---|
| 2013/0314951 | A1* | 11/2013 | Harrison | H02M 3/33592 363/21.02 |
| 2014/0140420 | A1* | 5/2014 | Ghovanloo | H04W 52/0209 375/259 |
| 2015/0180418 | A1* | 6/2015 | Maeda | H03F 3/193 375/297 |
| 2015/0233987 | A1* | 8/2015 | Von Novak, III | G01R 27/08 324/701 |
| 2015/0294697 | A1* | 10/2015 | Jung | G11C 11/419 327/55 |

FOREIGN PATENT DOCUMENTS

| | | | |
|---|---|---|---|
| KR | 2001-0010366 | | 2/2001 |
| KR | 10-0318155 | B1 | 12/2001 |
| KR | 10-1332566 | B1 | 11/2013 |
| KR | 10-2014-0106077 | | 9/2014 |

OTHER PUBLICATIONS

Yeo et al., U.S. Appl. No. 15/137,591, filed Apr. 25, 2016, now U.S. Pat. No. 10,411,513.

* cited by examiner

WIRELESS POWER TRANSMITTING APPARATUS, WIRELESS POWER RECEIVING APPARATUS, AND CIRCUIT FOR CORRECTING DIFFERENTIAL SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application claims the benefit under 35 U.S.C. § 119(a) of a Korean patent application filed on Sep. 18, 2015 in the Korean Intellectual Property Office and assigned Serial number 10-2015-0132655, the entire disclosure of which is hereby incorporated by reference.

TECHNICAL FIELD

The present disclosure relates to a wireless power transmitting apparatus, a wireless power receiving apparatus, and a circuit for correcting a differential signal. More particularly, the present disclosure relates to a wireless power transmitting apparatus and a wireless power receiving apparatus, which are capable of wirelessly transmitting and receiving power, and a circuit for correcting a differential signal, which corrects two signals that configure a differential signal.

BACKGROUND

Mobile terminals such as a mobile phone, a personal digital assistant (PDA) and the like are driven with rechargeable batteries due to their nature, and the battery of the mobile terminal is charged through supplied electronic energy by using a separate charging apparatus. Typically, the charging device and the battery have separate contact terminals at an exterior thereof, respectively, and are electrically connected with each other by contacting the contact terminals.

However, in such a contact-type charging scheme, the contact terminals protrude outwardly, and thus are easily contaminated by foreign substances. As a result, battery charging is not correctly performed. Further, the battery charging may also not be correctly performed in a case where the contact terminal is exposed to moisture.

Recently, a wireless charging or a non-contact charging technology has been developed and used for electronic devices to solve the above-mentioned problem.

The wireless charging technology uses wireless power transmission and reception, and corresponds to, for example, a system in which a battery is automatically charged if the battery is just put on a charging pad without connecting the mobile phone to a separate charging connector. In general, people know of wireless electric toothbrushes and/or wireless electric shavers as being systems that use the wireless charging technology. The wireless charging technology can improve a waterproof function because it can be used to wirelessly charge the electronic devices. The wireless charging technology can improve the portability of the electronic devices because it does not require a wired charger. Therefore, it is expected that technologies related to the wireless charging technology will be significantly developed in the coming age of electric cars.

The wireless charging technology largely includes an electromagnetic induction scheme that uses a coil, a resonance scheme that uses a resonance, and a radio frequency (RF)/microwave radiation scheme converts electrical energy to a microwave and then transmits the microwave.

Until now, the electromagnetic induction scheme has been considered mainstream, but it is expected that the day will come when all electronic products are wirelessly charged, anytime, anywhere, and without a wire in the near future based on the strength of recent successful experiments for wirelessly transmitting power to a destination that is spaced away by dozens of meters through the use of microwaves at home and abroad.

A power transmission method through the electromagnetic induction corresponds to a scheme of transmitting power between a first coil and a second coil. When a magnet is moved in a coil, induction current occurs. By using the induction current, a magnetic field is generated at a transferring end, and an electric current is induced according to a change of the magnetic field so as to create energy at a reception end. This phenomenon is referred to as the magnetic induction, and the power transmission method using magnetic induction has high energy transmission efficiency.

With respect to the resonance scheme, Prof Soljacic of the Massachusetts Institute of Technology (MIT) announced a system in which electricity is wirelessly transferred using a power transmission principle of the resonance scheme based on a coupled mode theory even if a device to be charged is separated from a charging device by several meters. A wireless charging system of an MIT team employs a concept in physics in which that resonance is the tendency in which when a tuning fork oscillates at a particular frequency, a wine glass next to the tuning fork oscillates at the same frequency. The research team makes an electromagnetic wave containing electrical energy resonate instead of making sounds resonate. It is known that the resonant electrical energy does not affect the surrounding machines and human bodies differently from other electromagnetic waves because the resonant electrical energy is directly transferred only to a device that has a resonance frequency and its unused part is reabsorbed into an electromagnetic field instead of spreading into the air.

Recently, a technology of generating a differential signal and inputting and outputting the differential signal during the process of inputting and outputting power inside the wireless power transmitting apparatus and a wireless power receiving apparatus has been developed. It is possible to improve wireless power transception efficiency and decrease electromagnetic interference (EMI) by using the difference signal.

The above information is presented as background information only to assist with an understanding of the present disclosure. No determination has been made, and no assertion is made, as to whether any of the above might be applicable as prior art with regard to the present disclosure.

SUMMARY

As described above, the wireless power transmitting apparatus and the wireless power receiving apparatus in the related art may generate a differential signal and input/output the generated differential signal between respective elements. When the differential signal is used, it is necessary to maintain a phase difference of 180° between two signals that configure the differential signal, and uniformly maintaining the balance of the signal is required. However, in the wireless charging system in the related art, in order to maintain a balance of the differential signal for each node, an adaptive switch having a large loss is used. In addition, when a location of the wireless power receiving apparatus is changed, resonance impedance may be changed. In this case, a waveform of the differential signal may be distorted according to a change in the resonance impedance, and a balance may be lost. Due to the loss of the balance, electromagnetic interference (EMI) may be increased and charging efficiency may deteriorate.

Aspects of the present disclosure are to address at least the above-mentioned problems and/or disadvantages and to provide at least the advantages described below. Accordingly, an aspect of the present disclosure is to provide a wireless power transmitting apparatus, a wireless power receiving apparatus, and a circuit for correcting a differential signal, which correct a differential signal so as to maintain a phase difference between two signals.

In accordance with an aspect of the present disclosure, a wireless power transmitting apparatus wirelessly charging a wireless power receiving apparatus is provided. The wireless power transmitting apparatus includes a power providing unit configured to provide power, a gate driver configured to generate a differential signal formed of a first signal and a second signal from the power provided from the power providing unit, an amplifier configured to amplify the differential signal by a predetermined gain, a power transmitting unit configured to transmit the amplified differential signal to the wireless power receiving apparatus, and a differential signal correcting circuit that is disposed between the gate driver and the amplifier and is configured to correct the differential signal so that a predetermined phase difference between the first signal and the second signal is maintained.

In accordance with another aspect of the present disclosure, a wireless power transmitting apparatus wirelessly charging a wireless power receiving apparatus is provided. The wireless power transmitting apparatus includes a power providing unit configured to provide power, a gate driver configured to generate a differential signal from the power provided from the power providing unit, an amplifier configured to amplify the differential signal by a predetermined gain, a power transmitting unit configured to transmit the amplified differential signal to the wireless power receiving apparatus, and a differential signal correcting circuit that is disposed between the amplifier and the power transmitting unit and is configured to correct the differential signal so that a predetermined phase difference between the first signal and the second signal that configures the amplified differential signal is maintained.

In accordance with another aspect of the present disclosure, a wireless power receiving apparatus wirelessly receiving power a wireless power transmitting apparatus is provided. The wireless power receiving apparatus includes a power receiving unit configured to wirelessly receive the power from the wireless power transmitting apparatus, a rectifier configured to rectify a differential signal output from the power receiving unit, a direct current to direct current (DC/DC) converter configured to DC/DC convert the rectified differential signal, and a differential signal correcting circuit that is disposed between the power receiving unit and the rectifier, and is configured to correct the differential signal so that a predetermined phase difference between the first signal and the second signal that configures the differential signal is maintained.

In accordance with another aspect of the present disclosure, a differential signal correcting circuit that corrects a differential signal formed of a first signal and a second signal is provided. The differential signal correcting circuit includes a first NAND gate configured to receive the first signal through a first input terminal, and a second NAND gate configured to receive the second signal through a third input terminal, in which an output terminal of the first NAND gate is connected to a fourth input terminal of the second NAND gate, and an output terminal of the second NAND gate is connected to a second input terminal of the first NAND gate.

In accordance with another of the present disclosure, a differential signal correcting circuit that corrects a differential signal formed of a first signal and a second signal is provided. The differential signal correcting circuit includes a first N-channel metal-oxide-semiconductor field-effect transistor (N-MOSFET), in which the first signal is applied to a first drain, and a second N-MOSFET, in which the second signal is applied to a second drain, in which a first source of the first N-MOSFET is ground, and a first gate of the first N-MOSFET is connected to the second drain of the second N-MOSFET, and a second source of the second N-MOSFET is grounded, and a second gate of the second N-MOSFET is connected to the first drain of the first N-MOSFET.

According to various embodiments of the present disclosure, it is possible to provide the wireless power transmitting apparatus, the wireless power receiving apparatus, and the differential signal correcting circuit, which correct a differential signal so that a phase difference between two signals is maintained. Accordingly, it is possible to decrease EMI, and improve charging efficiency. In addition, it is possible to decrease even mode harmonic by the two signals that configure the differential signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
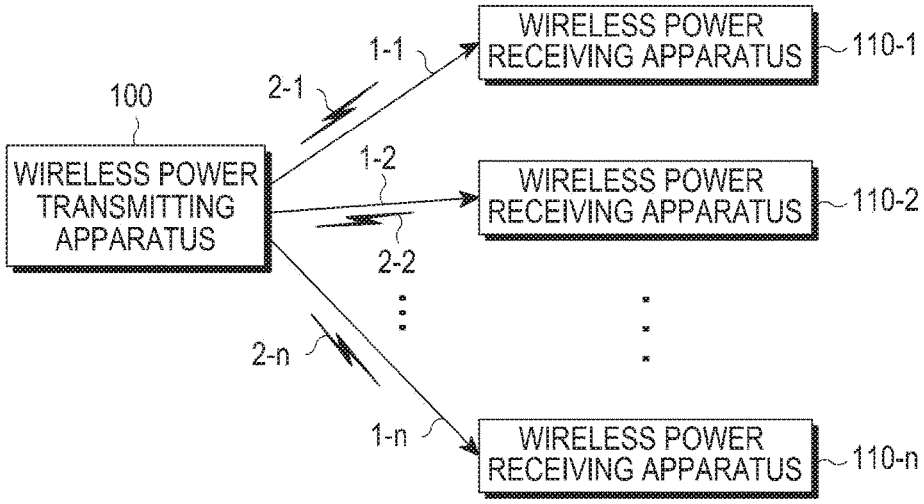
FIG. 1 illustrates a concept for describing the general operations of a wireless charging system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

As used herein, the expression "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude various embodiments of the present disclosure.

The wireless power receiving apparatus according to various embodiments of the present disclosure may be included in various types of electronic devices. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2), audio layer 3 MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

First, a concept of a wireless charging system that is applicable to an embodiment of the present disclosure will be described with reference to FIG. 1.

FIG. 1 illustrates a concept describing general operations of a wireless charging system according to various embodiments of the present disclosure.

Referring to FIG. 1, the wireless charging system includes a wireless power transmitting apparatus 100 and one or more wireless power receiving apparatuses 110-1, 110-2, . . . , and 110-n.

The wireless power transmitting apparatus 100 may wirelessly transmit power 1-1, 1-2, . . . , and 1-n to the one or more wireless power receiving apparatuses 110-1, 110-2, . . . , and 110-n, respectively. More particularly, the wireless power transmitting apparatus 100 may wirelessly transmit power 1-1, 1-2, . . . , and 1-n to only a wireless power receiving unit, which is authenticated through a predetermined authentication procedure.

The wireless power transmitting apparatus 100 may establish an electrical connection with the wireless power receiving apparatuses 110-1, 110-2, . . . , and 110-n. For example, the wireless power transmitting apparatus 100 may transmit wireless power in the form of electromagnetic waves to the wireless power receiving 110-1, 110-2, . . . , and 110-n. Here, the wireless power transmitting apparatus 100 may wirelessly transmit power based on an induction scheme or a resonance scheme.

Meanwhile, the wireless power transmitting apparatus 100 may perform bidirectional communication with the wireless power receiving apparatuses 110-1, 110-2, . . . , and 110-n. Here, the wireless power transmitting apparatus 100 and the wireless power receiving apparatuses 110-1, 110-2, and 110-n may process or transceive packets 2-1, 2-2, . . . , and 2-n formed of a predetermined frame. Particularly, the wireless power receiving apparatus may be implemented with a mobile communication terminal, a PDA, a PMP, a smart phone or the like.

The wireless power transmitting apparatus 100 may wirelessly provide power to a plurality of wireless power receiving apparatuses 110-1, 110-2, . . . , and 110-n. For example, the wireless power transmitting apparatus 100 may transmit power to the plurality of wireless power receiving apparatuses 110-1, 110-2, . . . , and 110-n through a resonance scheme. When the wireless power transmitting apparatus 100 adopts the resonance scheme, the distances between the wireless power transmitting apparatus 100 and the plurality of wireless power receiving apparatuses 110-1, 110-2, . . . , and 110-n may be distances that are operable in an indoor environment. Further, when the wireless power transmitting apparatus 100 adopts the electromagnetic induction scheme, a distance between the wireless power transmitting apparatus 100 and the plurality of wireless power receiving apparatuses 110-1, 110-2, . . . , and 110-n may be equal to or shorter than 10 cm.

The wireless power receiving apparatuses 110-1, 110-2, . . . , and 110-n may receive wireless power from the wireless power transmitting apparatus 100 to charge batteries therein. Further, the wireless power receiving apparatuses 110-1, 110-2, . . . , and 110-n may transmit a signal of requesting a wireless power transmission, information used for a reception of wireless power, information on a status of the wireless power receiving units, or information on a control of the wireless power transmitting apparatus 100 to the wireless power transmitting apparatus 100.

Further, the wireless power receiving apparatuses 110-1, 110-2, . . . , and 110-n may transmit a message indicating a charging state of each of the wireless power receiving apparatuses 110-1, 110-2, . . . , and 110-n to the wireless power transmitting apparatus 100.

The wireless power transmitting apparatus 100 may include a display means, such as a display, and display a state of each of the wireless power receiving apparatuses 110-1, 110-2, . . . , and 110-n based on a message received from each of the wireless power receiving apparatuses 110-1, 110-2, . . . , and 110-n. Also, the wireless power transmitting apparatus 100 may display an expected time period until the charging of each of the wireless power receiving apparatuses 110-1, 110-2 and 1110-n is completed, together with the state of each of the wireless power receiving apparatuses 110-1, 110-2 and 1110-n.

The wireless power transmitting apparatus 100 may transmit a control signal for disabling a wireless charging function to each of the wireless power receiving apparatuses 110-1, 110-2, . . . , and 110-n. The wireless power receiving units having received the disable control signal of the wireless charging function from the wireless power transmitting apparatus 100 may disable the wireless charging function.

Figure 2:
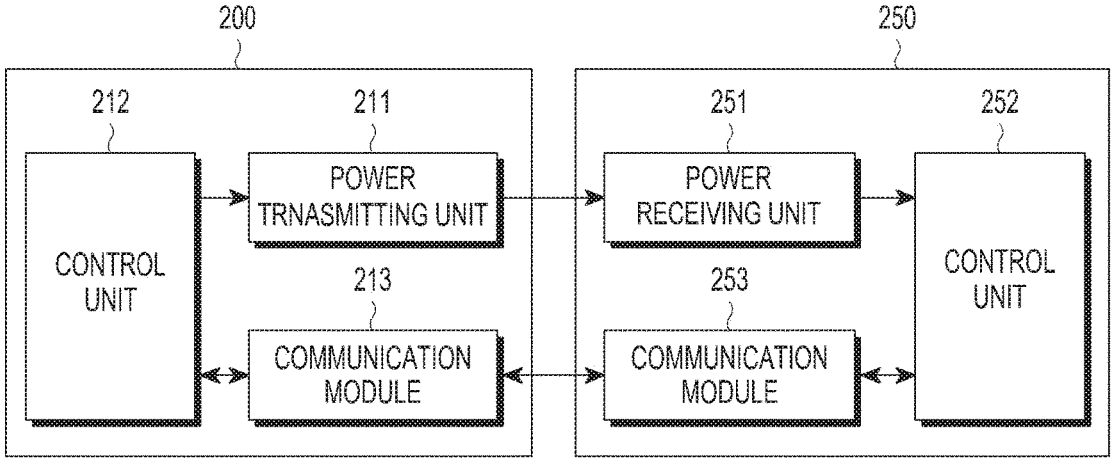
FIG. 2 is a block diagram illustrating a wireless power transmitting apparatus and a wireless power receiving apparatus according to various embodiments of the present disclosure.

FIG. 2 is a block diagram illustrating a wireless power transmitting unit and a wireless power receiving unit according to various embodiments of the present disclosure.

Referring to FIG. 2, the wireless power transmitting apparatus 200 may include a power transmitting unit 211, a control unit 212, and a communication module 213. Further, the wireless power receiving apparatus 250 may include a power receiving unit 251, a control unit 252, and a communication module 253.

The power transmitting unit 211 may supply power which is used by the wireless power transmitting apparatus 200, and wirelessly provide power to the wireless power receiving apparatus 250. Here, the power transmitting unit 211 provides the power in the form of alternate current waves, and also may supply power in the form of direct current waves. Furthermore, the power transmitting unit 211 may convert the direct current waves into the alternate current waves by using an inverter so as to provide the power in the form of alternate current waves. The power transmitting unit 211 may be implemented in the form of an embedded battery or in the form of a power receiving interface so as to receive the power from outside thereof and supply the power to the other components. It will be easily understood by those skilled in the art that the power transmitting unit 211 is not limited if it can supply the power of constant alternate current waves.

In addition, the power transmitting unit 211 may supply the alternating current waves to the wireless power receiving apparatus 250. The power transmitting unit 211 may further include a resonance circuit or an induction circuit, which results in the transmission or the reception of desired electromagnetic waves. When the power transmitting unit 211 is implemented by the resonance circuit, inductance L of a loop coil of the resonance circuit may be changed. Meanwhile, it will be easily understood by those skilled in the art that the power transmitting unit 211 is not limited if it can transmit and receive the electromagnetic waves.

The control unit 212 may control the overall operations of the wireless power transmitting apparatus 200. The control unit 212 or the control unit 252 may control an overall operation of the wireless power transmitting apparatus 200 by using an algorithm, a program, or an application which is used for a control and read from a storage unit (not shown).

The control unit 212 may be implemented in the form of a CPU, a microprocessor, or a mini computer. In the meantime, the control unit 252 may control overall operations of the wireless power transmitting apparatus 200.

The communication module 213 may communicate with the wireless power receiving apparatus 250 by a predetermined scheme. The communication module 213 may communicate with the communication module 253 of the wireless power receiving apparatus 250 by using near field communication (NFC), ZigBee communication, infrared communication, visible ray communication, Bluetooth communication, Bluetooth low energy (BLE). The communication module 213 may also use a carrier sense multiple access with collision avoidance (CSMA/CA) algorithm. On the other hand, the above mentioned communication schemes are merely illustrated, and the scope of the present disclosure is not limited by a specific communication scheme which is performed by the communication module 213.

In the meantime, the communication module 213 may transmit a signal about information about the wireless power transmitting apparatus 200. Here, the communication module 213 may unicast, multicast, or broadcast the signal.

Further, the communication module 213 may receive power information from the wireless power receiving apparatus 250. Here, the power information may include at least one of the capacity of the wireless power receiving apparatus 250, the residual amount of the battery, the number of times of charging, the amount of use, the battery capacity, and the proportion of the battery.

Further, the communication module 213 may transmit a charging function control signal of controlling a charging function of the wireless power receiving apparatus 250. The charging function control signal may be a control signal of controlling the power receiving unit 251 of the specific wireless power receiving apparatus 250 so as to enable or disenable the charging function.

The communication module 213 may receive a signal from another wireless power transmitting apparatus (not illustrated) as well as the wireless power receiving apparatus 250.

The wireless power transmitting apparatus 200 and the wireless power receiving apparatus 250 may transmit and receive various signals, and thus, a subscription of the wireless power receiving apparatus 250 to a wireless power network handled by the wireless power transmitting apparatus 200 and a charging process through wireless power transception may be performed.

The power receiving unit 251 may wirelessly receive power from the power transmitting unit 211 based on the induction scheme or the resonance scheme.

Figure 3:
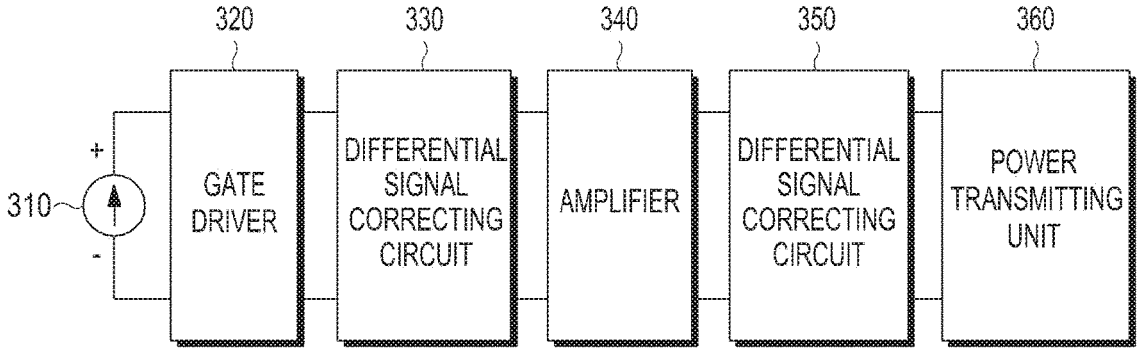
FIG. 3 is a block diagram illustrating a wireless power transmitting apparatus according to various embodiments of the present disclosure.

FIG. 3 is a block diagram illustrating a wireless power transmitting apparatus according to various embodiments of the present disclosure.

Referring to FIG. 3, the wireless power transmitting apparatus may include a power providing unit 310, a gate driver 320, a differential signal correcting circuit 330, an amplifier 340, a differential signal correcting circuit 350, and a power transmitting unit 360.

The power providing unit 310 may provide power to be transmitted to a wireless power receiving apparatus. The power providing unit 310 may be implemented in the form of a battery, or may also be implemented in the form of a power interface which receives power from the outside and provides the received power. Although not illustrated, when the power providing unit 310 provides power in the form of a direct current, the power providing unit 310 may also additionally include an inverter which changes a direct current form into an alternating current form and outputs power in the changed alternating current form. The power providing unit 310 may also output power in the form of an alternating current.

The gate driver 320 may generate a differential signal by using the power from the power providing unit 310. The differential signal may be formed of a first signal and a second signal, and in the embodiment of the present disclosure, the first signal and the second signal may have a predetermined phase difference, for example, a phase difference of 180°.

The differential signal correcting circuit 330 may correct the differential signal so that the first signal and the second signal of the differential signal have the predetermined phase difference. Various implementation forms of the differential signal will be described in more detail below. For example, even when a phase difference between the first signal and the second signal deviates from 180° by a change of a location of the wireless power receiving apparatus, the differential signal may be corrected by the differential signal correcting circuit 330 so that the phase difference between the first signal and the second signal is maintained at 180°. Accordingly, the wireless power transmitting apparatus may maintain wireless charging efficiency and relatively low electromagnetic interference (EMI).

The amplifier 340 may amplify the differential signal by a predetermined gain. In various embodiments of the present disclosure, the amplifier 340 may be implemented by, for example, a class D or class E amplifier, but those skilled in the art may easily understand that the kind of amplifier is not limited.

The differential signal correcting circuit 350 may correct the differential signal so that a phase difference between two signals that configure the amplified differential signal has a predetermined phase difference, for example, a phase difference of 180°. The differential signal correcting circuit 350 may be disposed between the amplifier 340 and the power transmitting unit 360. That is, the wireless power transmitting apparatus according to various embodiments of the present disclosure may include the differential signal correcting circuit 330 between the gate driver 320 and the amplifier 340, or include the differential signal correcting circuit 350 between the amplifier 340 and the power transmitting unit 360. Otherwise, as illustrated in FIG. 3, the wireless power transmitting apparatus may also include the differential signal correcting circuits 330 and 350 in both between the gate driver 320 and the amplifier 340, and between the amplifier 340 and the power transmitting unit 360.

The power transmitting unit 360 may receive the differential signal, and wirelessly transmit power to the wireless power receiving apparatus by using the received differential signal. For example, when the wireless power transmitting apparatus is based on the resonance scheme, the power transmitting unit 360 may include a resonance circuit so as to have a resonance frequency based on the standard of the resonance scheme. When the wireless power transmitting apparatus is based on the induction scheme, the power transmitting unit 360 may include a primary coil. That is, the power transmitting unit 360 may wirelessly transmit power to the wireless power receiving apparatus based on various wireless power transmitting schemes without regard to the wireless power transmitting scheme.

As described above, the phase difference between the two signals that configure the differential signal may be maintained with a predetermined numerical value, for example, 180°, by one or more differential signal correcting circuits 330 and 350, thereby securing relatively high wireless charging efficiency and relatively low EMI.

Figure 4:
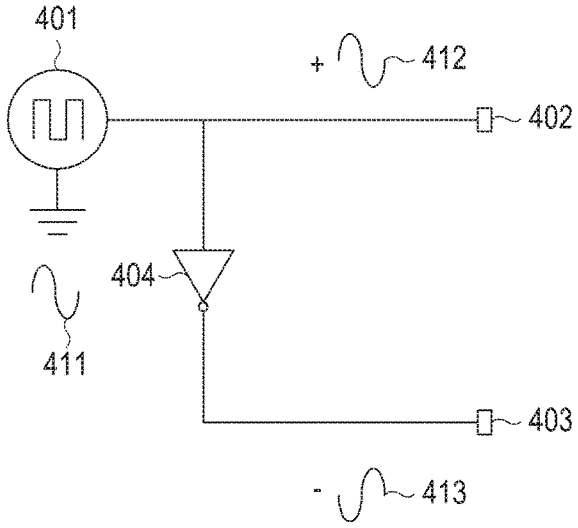
FIG. 4 is a comparative example for describing a differential signal generating process for a comparison with the present disclosure according to various embodiments of the present disclosure.

FIG. 4 is a comparative example for describing a differential signal generating process for a comparison with the present disclosure according to various embodiments of the present disclosure.

Referring to FIG. 4, in the comparative example, the wireless power transmitting apparatus may include a power providing unit 401. The power providing unit 401 may provide power 411. A first signal 412 having the same phase as that of the power 411 may be output to a first terminal 402 connected to the power providing unit 401. A second signal 413, which is a reverse signal of the power 411, may be output to a second terminal 403, which is connected to the power providing unit 401 and is in parallel to the first terminal 402. More particularly, an inverter 404 disposed between the power providing unit 401 and the second terminal 403 may reverse and output the power 411, and thus, the second signal 413 may be a reverse signal of the power 411. Accordingly, the first signal 412 and the second signal 413 may configure a differential signal while having a phase difference of 180°.

Figure 5A:
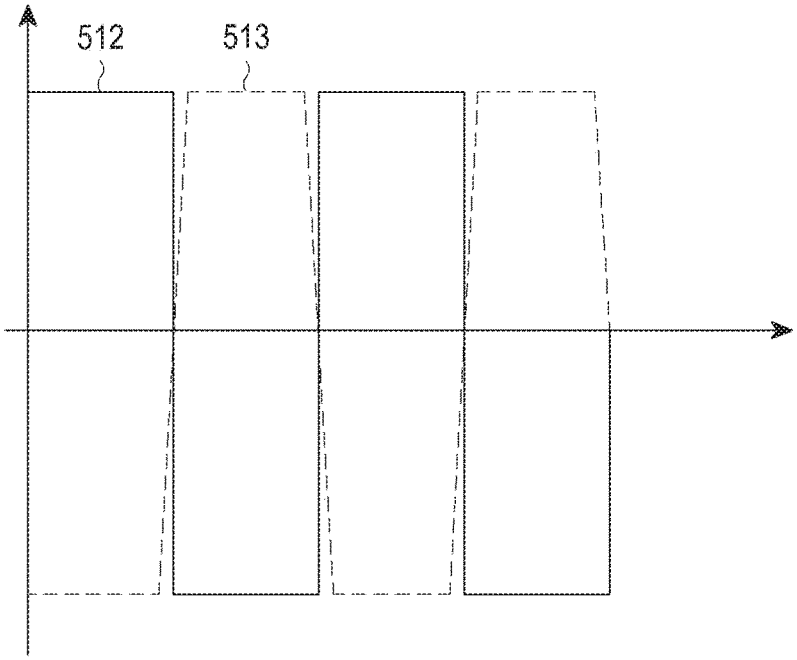
FIGS. 5A and 5B illustrate signal waveforms according to the comparative example according to various embodiments of the present disclosure.
Figure 5B:
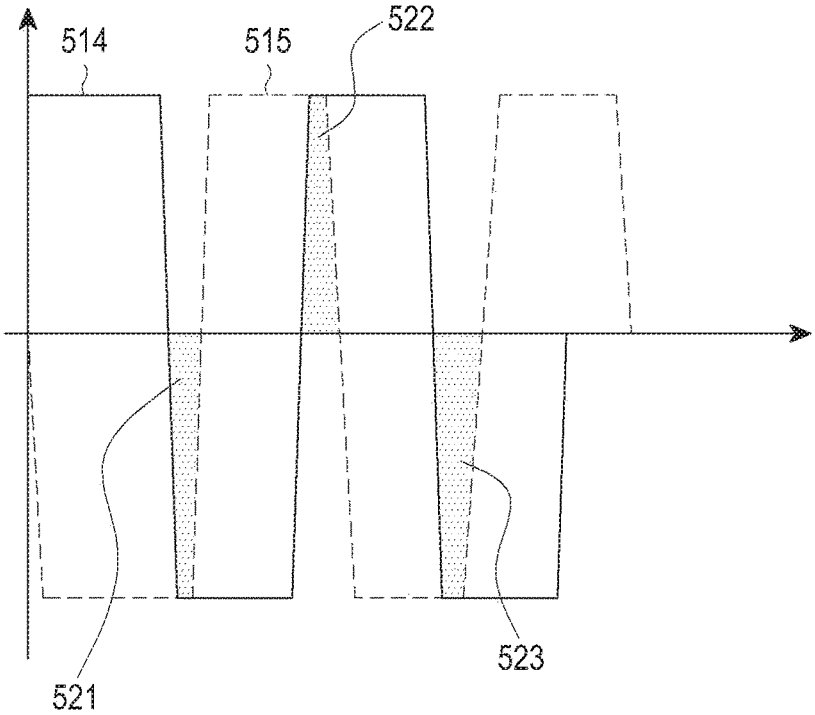

FIGS. 5A and 5B illustrate signal waveforms according to the comparative example according to various embodiments of the present disclosure.

Referring to FIG. 5A, a first waveform 512 and a second waveform 513 for the first signal 412 and the second signal 413 of FIG. 4 is illustrated, respectively. The first waveform 512 of the first signal 412 may have a form of a square wave, and the second waveform 513 of the second signal 413 may have a form of a square wave. As described above, the first signal 412 and the second signal 413 may have a phase difference of 180°, and thus it can be seen that it is illustrated as if the first waveform 512 and the second waveform 513 have a phase difference of 180°.

In the meantime, for example, the phase difference between the first signal 412 and the second signal 413 may not be maintained at 180° by a change in a location of the wireless power receiving apparatus and the like. As illustrated in FIG. 5B, it can be seen that the second waveform 515 corresponding to the second signal 413 moves to the right side compared to FIG. 5A. Accordingly, it can be seen that the first waveform 514 and the second waveform 515 fail to maintain the phase difference of 180°. Since the first waveform 514 and the second waveform 515 fail to maintain the phase difference of 180°, portions 521, 522, and 523, in which a part of the first waveform 514 overlaps a part of the second waveform 515, may be generated. Since the portions 521, 522, and 523 are generated, in which the part of the first waveform 512 overlaps the part of the second waveform 514, EMI may be increased and entire wireless charging efficiency may deteriorate.

Figure 6:
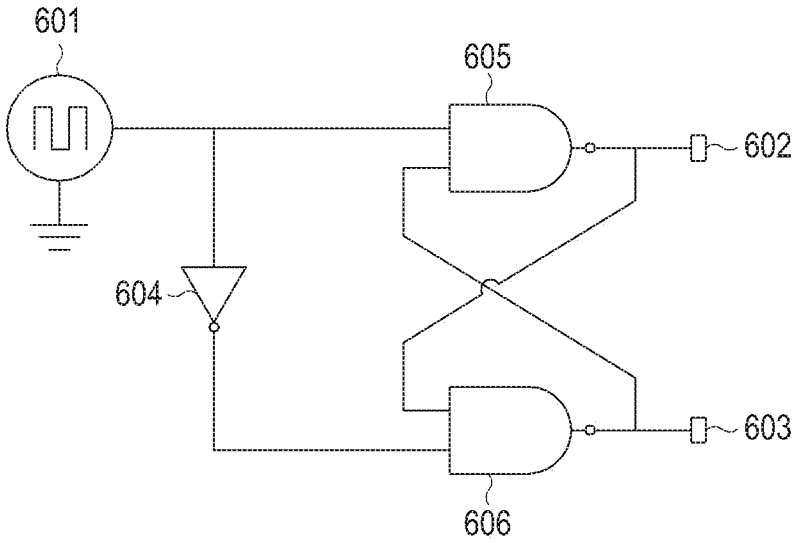
FIG. 6 is a circuit diagram of a differential signal correcting circuit according to various embodiments of the present disclosure.

FIG. 6 is a circuit diagram of a differential signal correcting circuit according to various embodiments of the present disclosure.

Referring to FIG. 6, the differential signal correcting circuit according to various embodiments of the present disclosure may include two NAND gates 605 and 606. The wireless power transmitting apparatus according to various embodiments of the present disclosure may include a power providing unit 601. As described above, the power providing unit 601 may provide power, and an inverter 604 may output a reverse signal of the provided power. Accordingly, a first signal having the same phase as that of the power may be input into a first input terminal of the first NAND gate 605, and a second signal having a phase difference of 180° with the power may be input into a third input terminal of the second NAND gate 606.

In the meantime, a second input terminal of the first NAND gate 605 may be connected to an output terminal of the second NAND gate 606. Further, a fourth input terminal of the second NAND gate 606 may be connected to an output terminal of the first NAND gate 605. Accordingly, a phase difference between the first signal that configures the differential signal output from the first output terminal 602 and the second signal that configures the differential signal output from the second output terminal 603 may be maintained at 180°.

Figure 7A:
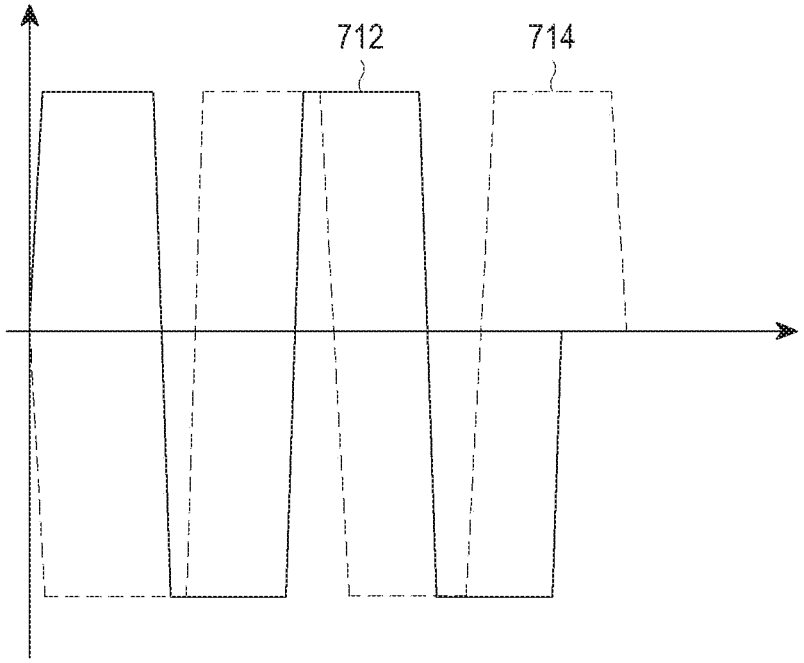
FIGS. 7A and 7B illustrate a signal waveform according to various embodiments of the present disclosure.
Figure 7B:
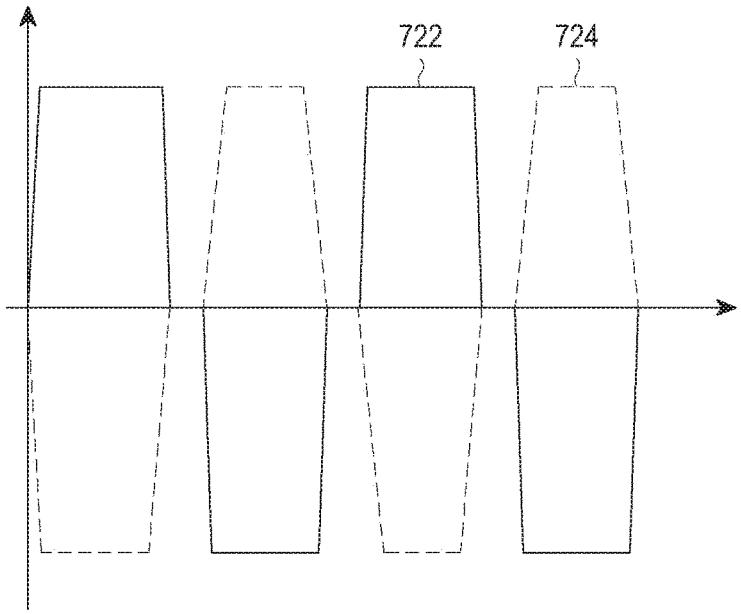

FIGS. 7A and 7B illustrate a signal waveform according to various embodiments of the present disclosure.

More particularly, referring to FIG. 7A, it is assumed that a phase difference between a waveform 712 of the first signal and a waveform 714 of the second signal deviates from 180° by a change in a location of the wireless power receiving apparatus and the like. As illustrated in FIG. 7A, for example, the waveform 714 of the second signal may move to a right side by a change in a location of the wireless power receiving apparatus and the like, so that phase difference between the waveform 712 of the first signal and the waveform 714 of the second signal may deviate from 180°.

In this case, an overlapping portion may be generated between the first signal and the second signal. The differential signal correcting circuit according to various embodiments of the present disclosure may control both the signals to not be output in the overlapping portion between the first signal and the second signal. Accordingly, a corrected waveform 722 of the first signal and a corrected waveform 724 of the second signal may maintain a phase difference of 180° having no overlapping portion.

A truth table between an input and an output of the first NAND gate 605 and the second NAND gate 606 may be represented as Table 1.

TABLE 1

| Input | Output |
|---|---|
| 1, 1 | 0 |
| 0, 1 | 1 |
| 1, 0 | 1 |
| 0, 0 | 1 |

According to the connection of the circuit in FIG. 6, only when signals of the output terminals of the NAND gates 605 and 606 are in an on state, a signal may be applied to an input terminal cross-connected to the output terminals of the NAND gates 605 and 606. When the signal applied to the first input terminal of the first NAND gate 605 has the same phase as that of a signal applied to the fourth input terminal of the second NAND gate 606, a signal may not be output from at least one of the first NAND gate 605 and the second NAND gate 606, and thus, a signal may not be output form the entire NAND gates 605 and 606.

As described above, when the output of the NAND gates 605 and 606 is essentially in an on-state, a signal may be output from the NAND gates 605 and 606, and a portion, in which the two signals that configure the differential signal have the same phase, may be excluded. Accordingly, as illustrated in FIG. 7B, the corrected waveforms 722 and 724 of the differential signal, in which an overlapping section of the waveforms of the two signals is excluded, is illustrated.

As described above, the differential signal correcting circuit according to various embodiments of the present disclosure may perform the correction by a scheme of not-outputting both signals in the section, in which the phase difference between the differential signals deviates by 180°, and the phase difference between the two signals that configure the corrected differential signal may be maintained at 180°.

Figure 8:
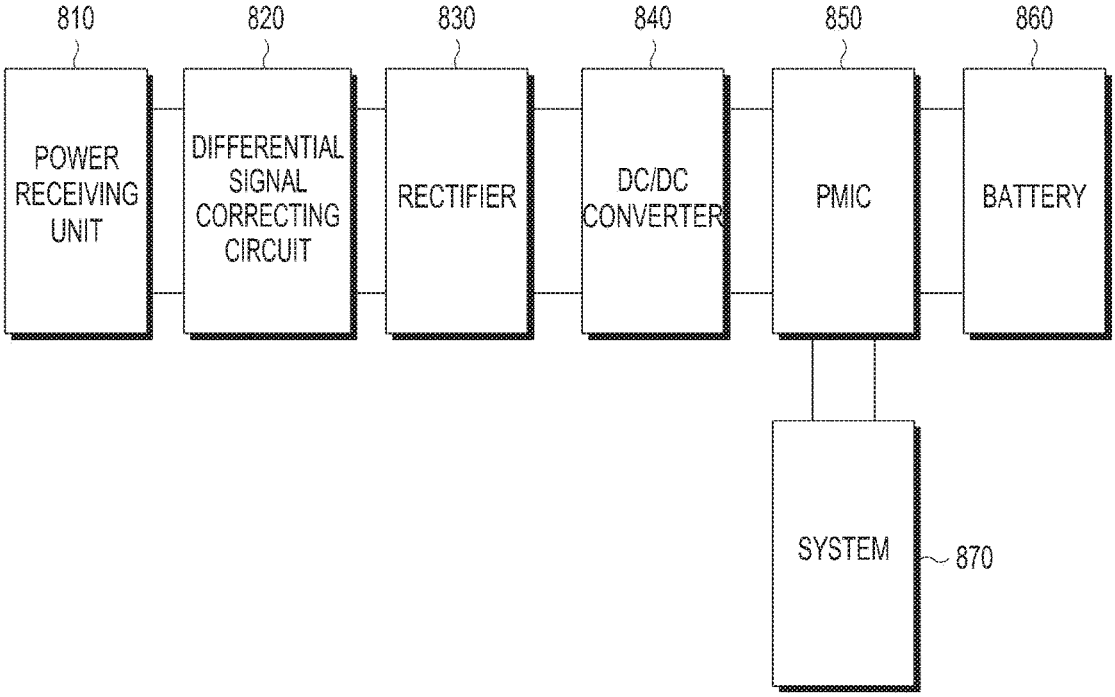
FIG. 8 is a block diagram illustrating a wireless power receiving apparatus according to various embodiments of the present disclosure.

FIG. 8 is a block diagram illustrating a wireless power receiving apparatus according to various embodiments of the present disclosure.

Referring to FIG. 8, the wireless power receiving apparatus may include a power receiving unit 810, a differential signal correcting circuit 820, a rectifier 830, a direct current to direct current (DC/DC) converter 840, a power management integrated circuit (PMIC) 850, a system 870, and a battery 860.

The power receiving unit 810 may receive power from the wireless power transmitting apparatus. For example, when the wireless power receiving apparatus is based on the resonance scheme, the power receiving unit 810 may include a resonance circuit so as to have a resonance frequency based on the standard of the resonance scheme. When the wireless power receiving apparatus is based on the induction scheme, the power receiving unit 810 may include a secondary coil. That is, the power receiving unit 810 may wirelessly receive power from the wireless power transmitting apparatus based on various wireless power receiving schemes without regard to the wireless power receiving scheme.

The differential signal correcting circuit 820 may correct the differential signal so that a phase difference between two signals that configure the differential signal has a predetermined phase difference, for example, a phase difference of 180°. For example, the differential signal correcting circuit 820 may include the structure illustrated in FIG. 6, and in another example, the differential signal correcting circuit 820 may also include the structure illustrated in FIG. 10, which will be described in more detail below.

The rectifier 830 may output a signal in the form of a direct current by rectifying the corrected differential signal. The DC/DC converter 840 may convert a voltage of the signal in the form of the direct current. The PMIC 850 may manage power by which each element of the wireless power receiving apparatus is input/output, and wirelessly output the received power to the battery 860 or the system 870. The battery 860 is a chargeable battery, and is detachable or may be integrally embedded in the wireless power receiving apparatus.

As described above, the wireless power receiving apparatus may also include the differential signal correcting circuit 820, and thus, a phase difference between two signals that configure a differential signal may be maintained at 180°, thereby securing relatively high charging efficiency and relatively low EMI.

Figure 9:
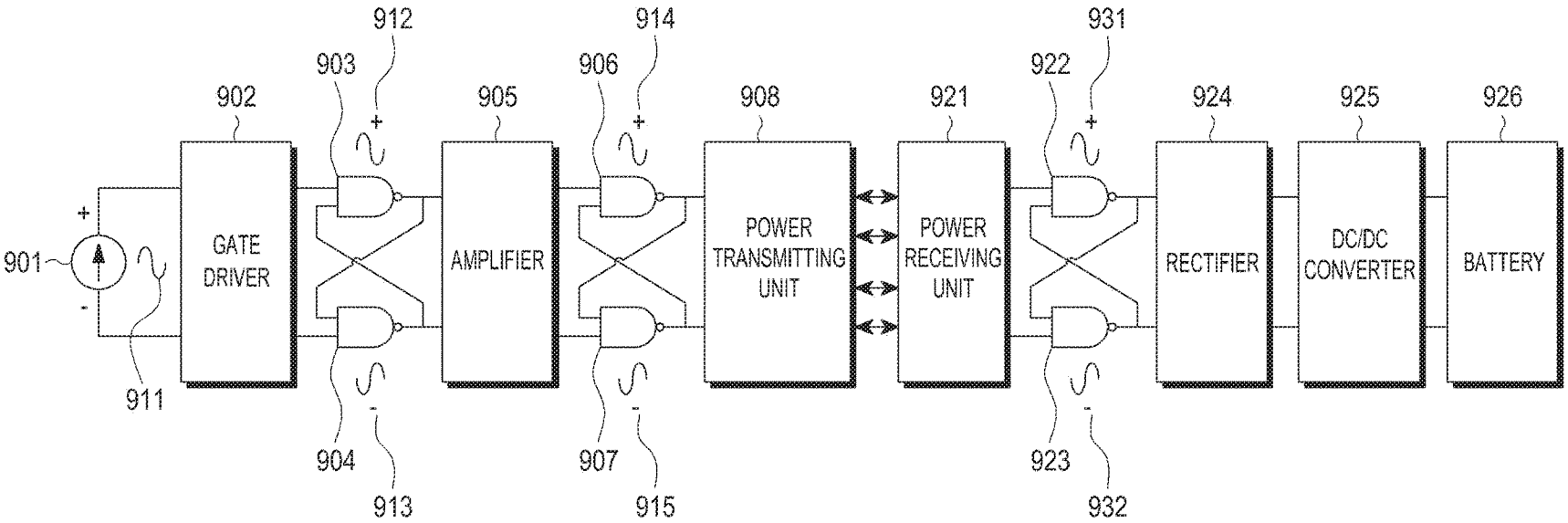
FIG. 9 illustrates a concept for describing a configuration of a wireless power transceiving system according to various embodiments of the present disclosure.

FIG. 9 illustrates a concept for describing a configuration of a wireless power transceiving system according to various embodiments of the present disclosure.

Referring to FIG. 9, a wireless power transmitting apparatus may include a power providing unit 901, a gate driver 902, an amplifier 905, and a power transmitting unit 908. Further, the wireless power transmitting apparatus may include two NAND gates 903 and 904 disposed between the gate driver 902 and the amplifier 905. A first signal 912 having the same phase as that of power 911 provided from the power providing unit 901 may be input into one input terminal of the NAND gate 903. A second signal 913 that is a reverse signal of power 911 provided from the power providing unit 901 may be input into one input terminal of the NAND gate 904. In the meantime, an output terminal of the NAND gate 904 may be connected to another input terminal of the NAND gate 903, and an output terminal of the NAND gate 903 may be connected to another input terminal of the NAND gate 904. According to the description, a phase difference between the first signal 912 and the second signal 913 may be maintained with a predetermined numerical value, for example, 180°.

In the meantime, the wireless power transmitting apparatus may include two NAND gates 906 and 907 disposed between the amplifier 905 and the power transmitting unit 908. A first signal 914 may be input into one input terminal of the NAND gate 906. A second signal 915 having a phase difference of 180° with the first signal 914 may be input into one input terminal of the NAND gate 907. In the meantime, an output terminal of the NAND gate 907 may be connected to another input terminal of the NAND gate 906, and an output terminal of the NAND gate 906 may be connected to another input terminal of the NAND gate 907. According to the description, a phase difference between the first signal 914 and the second signal 915 may be maintained with a predetermined numerical value, for example, 180°.

The wireless power receiving apparatus may include a power receiving unit 921, a rectifier 924, a DC/DC converter 925, and a battery 926. The wireless power receiving apparatus may include two NAND gates 922 and 923 disposed between the power receiving unit 921 and the rectifier 924. A first signal 931 may be input into one input terminal of the NAND gate 922. A second signal 932 having a phase difference of 180° with the first signal 931 may be input into one input terminal of the NAND gate 923. In the meantime, an output terminal of the NAND gate 923 may be connected to another input terminal of the NAND gate 922, and an output terminal of the NAND gate 922 may be connected to another input terminal of the NAND gate 923. According to the description, a phase difference between the first signal 931 and the second signal 932 may be maintained with a predetermined numerical value, for example, 180°.

Figure 10:
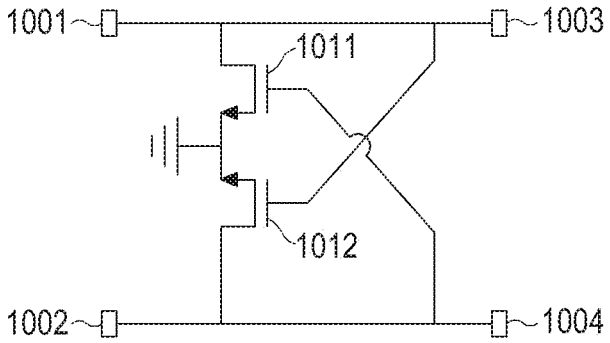
FIG. 10 is a circuit diagram for describing a configuration of a differential signal correcting circuit according to various embodiments of the present disclosure.

FIG. 10 is a circuit diagram for describing a configuration of a differential signal correcting circuit according to various embodiments of the present disclosure.

Referring to FIG. 10, the differential signal correcting circuit may have a first input terminal 1001 and a second input terminal 1002. The differential signal correcting circuit may include a first N-channel metal-oxide-semiconductor field-effect transistor (N-MOSFET) 1011, in which a first drain is connected to the first input terminal 1001, and a second N-MOSFET 1012, in which a second drain is connected to the second input terminal 1002. A first source of the first N-MOSFET 1011 may be grounded, and a second source of the second N-MOSFET 1012 may be grounded. A first gate of the first N-MOSFET 1011 may be connected to the second input terminal 1002 and a second output terminal 1004, and a second gate of the second N-MOSFET 1012 may be connected to the first input terminal 1001 and a first output terminal 1003.

The first output terminal 1003 and the second output terminal 1004 are connected to the first drain of the first N-MOSFET 1011 and the second drain of the second N-MOSFET 1012, so that each of the second gate and the first gate may be in the on-state only when the first drain and the second drain are in the on-state. Accordingly, only when signals having opposite phases are input into the first input terminal 1001 and the second input terminal 1002, the signal may be output from the output terminals 1003 and 1004. When the signals having the same phase are input into each of the first input terminal 1001 and the second input terminal 1002, the signal may not be output from the output terminals 1003 and 1004.

According to the description, the signals output from the output terminals 1003 and 1004 may have opposite phases, for example, a phase difference of 180°, and an output of the signals which are determined to have the same phase may be restricted. That is, an output of an overlapping portion of the two signals that configure the differential signal caused by a change in a location of the wireless power receiving apparatus may be restricted, and the phase difference between the two signals that configure the corrected differential signal may be maintained at 180°.

Figure 11:
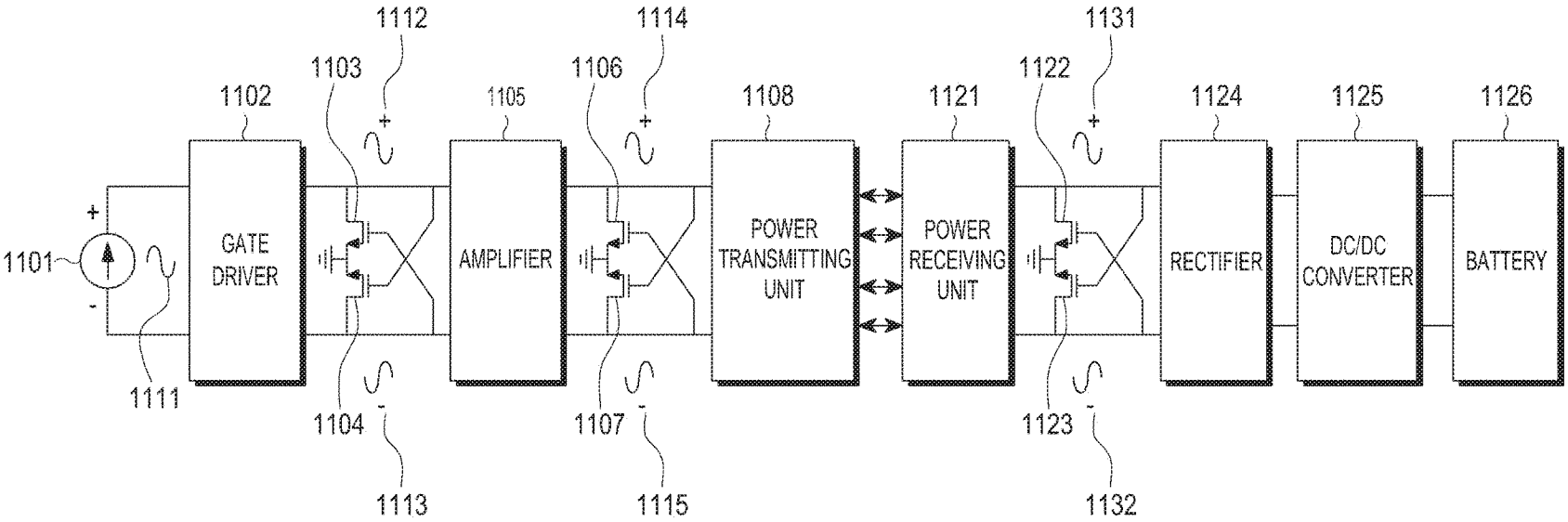
FIG. 11 illustrates a concept for describing a wireless power transceiving system according to various embodiments of the present disclosure.

FIG. 11 illustrates a concept for describing a wireless power transceiving system according to various embodiments of the present disclosure.

Referring to FIG. 11, a wireless power transmitting apparatus may include a power providing unit 1101, a gate driver 1102, an amplifier 1105, and a power transmitting unit 1108. Further, the wireless power transmitting apparatus may include two N-MOSFET 1103 and 1104 disposed between the gate driver 1102 and the amplifier 1105. A first signal 1112 having the same phase as that of provided power 1111 may be input into a drain of the N-MOSFET 1103. A second signal 1113 that is a reverse signal of power 1111 provided from the power providing unit 1101 may be input into a drain of the N-MOSFET 1104. In the meantime, a source of the N-MOSFET 1103 and a source of the N-MOSFET 1104 may be grounded. A gate of the N-MOSFET 1103 may be connected to a drain of the N-MOSFET 1104, and a gate of the N-MOSFET 1104 may be connected to a drain of the N-MOSFET 1103. According to the description, a phase difference between the first signal 1112 and the second signal 1113 may be maintained with a predetermined numerical value, for example, 180°.

In the meantime, the wireless power transmitting apparatus may include two N-MOSFETs 1106 and 1107 disposed between the amplifier 1105 and the power transmitting unit 1108. A first signal 1114 may be input into a drain of the N-MOSFET 1106. A second signal 1115 having a phase difference of 180° with the first signal 1114 may be input into a drain of the N-MOSFET 1107. In the meantime, a source of the N-MOSFET 1106 and a source of the N-MOSFET 1107 may be grounded. A gate of the N-MOSFET 1106 may be connected to a drain of the N-MOSFET 1107, and a gate of the N-MOSFET 1107 may be connected to a drain of the N-MOSFET 1106. According to the description, a phase difference between the first signal 1114 and the second signal 1115 may be maintained with a predetermined numerical value, for example, 180°.

The wireless power receiving apparatus may include a power receiving unit 1121, a rectifier 1124, a DC/DC converter 1125, and a battery 1126. The wireless power receiving apparatus may include two N-MOSFETs 1122 and 1123 disposed between the power receiving unit 1121 and the rectifier 1124. A first signal 1131 may be input into a drain of the N-MOSFET 1122. A second signal 1132 having a phase difference of 180° with the first signal 1131 may be input into a drain of the N-MOSFET 1123. In the meantime, a source of the N-MOSFET 1122 and a source of the N-MOSFET 1123 may be grounded. A gate of the N-MOSFET 1122 may be connected to a drain of the N-MOSFET 1123, and a gate of the N-MOSFET 1123 may be connected to a drain of the N-MOSFET 1122. According to the description, a phase difference between the first signal 1131 and the second signal 1132 may be maintained with a predetermined numerical value, for example, 180°.

Figure 12:
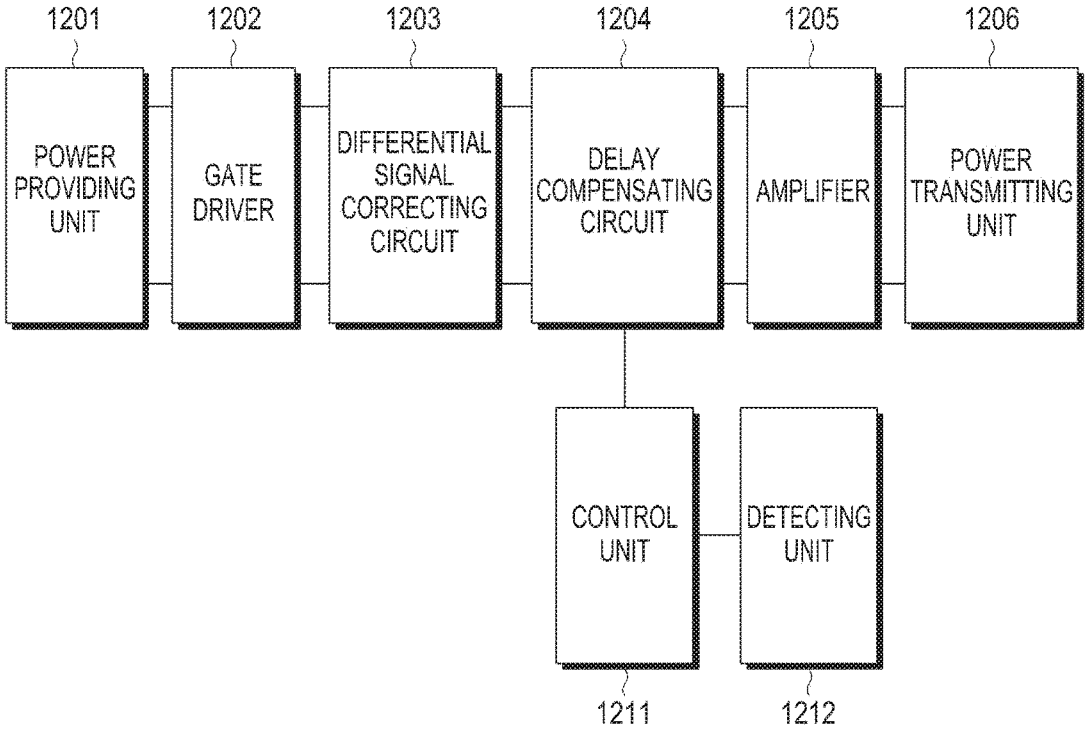
FIG. 12 is a block diagram illustrating a wireless power transmitting apparatus according to various embodiments of the present disclosure.

FIG. 12 is a block diagram illustrating a wireless power transmitting apparatus according to various embodiments of the present disclosure.

Referring to FIG. 12, the wireless power transmitting apparatus may include a power providing unit 1201, a gate driver 1202, a differential signal correcting circuit 1203, a delay compensating circuit 1204, an amplifier 1205, a power transmitting unit 1206, a control unit 1211, and a detecting unit 1212.

The delay compensating circuit 1204 may compensate for a delay between two signals of a differential signal. For example, when a delay is generated between one signal and a reverse signal of the other signal, which configure the differential signal, as illustrated in FIG. 7A, the delay compensating circuit 1204 may delay at least one signal so that the delay is not generated between the one signal and the reverse signal of the other signal, which configure the differential signal. The delay compensating circuit 1204 compensates for the delay between the one signal and the reverse signal of the other signal, which configure the differential signal, so that a phase difference between the two signals that configure the differential signal may be adjusted to 180°.

The detecting unit 1212 may detect at least one among a load, a voltage, and a current at least one point of the wireless power transmitting apparatus. The control unit 1211 may calculate the delay between the one signal and the reverse signal of the other signal, which configure the differential signal, by using at least one detected among the load, the voltage, and the current detected by the detecting unit 1212. The control unit 1211 may calculate a degree of the delay of at least one signal by using the calculated delay. The control unit 1211 may make at least one signal be delayed by controlling the delay compensating circuit 1204 by using the degree of the delay. By the delay of at least one signal, a phase difference between the two signals that configure the differential signal may be adjusted to 180°.

Figure 13:
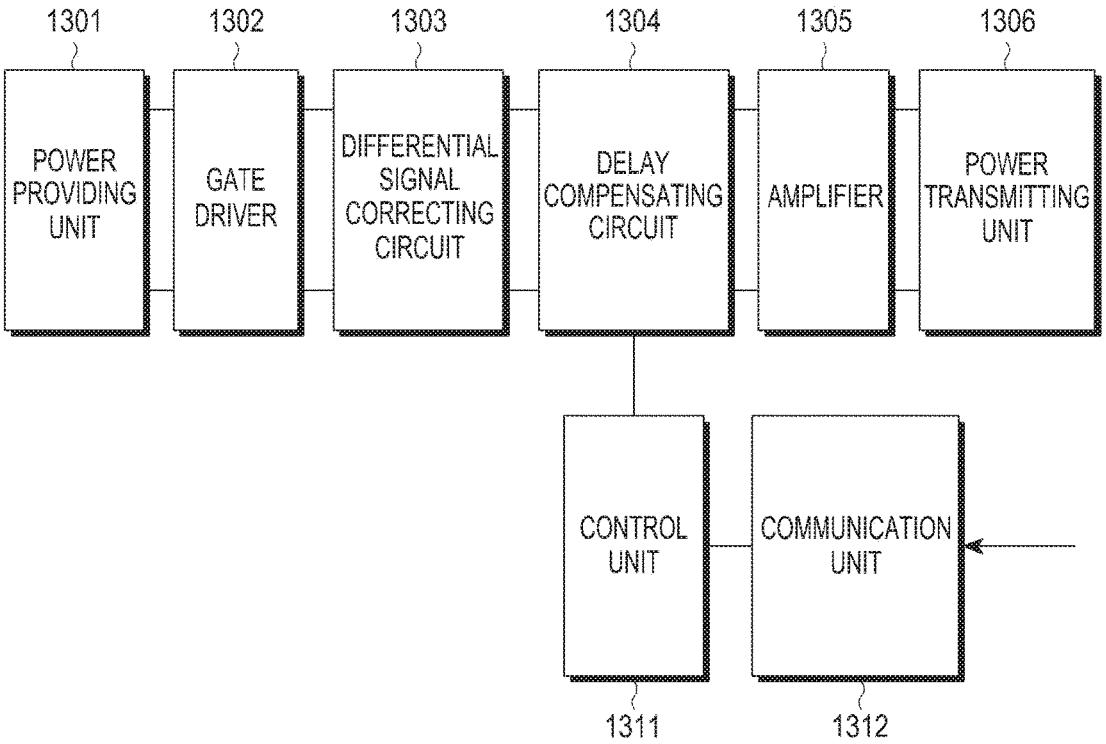
FIG. 13 is a block diagram illustrating a wireless power transmitting apparatus according to various embodiments of the present disclosure.

FIG. 13 is a block diagram illustrating a wireless power transmitting apparatus according to various embodiments of the present disclosure.

Referring to FIG. 13, the wireless power transmitting apparatus may include a power providing unit 1301, a gate driver 1302, a differential signal correcting circuit 1303, a delay compensating circuit 1304, an amplifier 1305, a power transmitting unit 1306, a control unit 1311, and a communication unit 1312.

The delay compensating circuit 1304 may compensate for a delay between two signals of a differential signal. For example, when a delay is generated between one signal and a reverse signal of the other signal, which configure the differential signal, as illustrated in FIG. 7A, the delay compensating circuit 1304 may delay at least one signal so that the delay is not generated between the one signal and the reverse signal of the other signal, which configure the differential signal. The delay compensating circuit 1304 compensates for the delay between the one signal and the reverse signal of the other signal, which configure the differential signal, so that a phase difference between the two signals that configure the differential signal may be adjusted to 180°.

The communication unit 1312 may receive information on a delay between the one signal and the reverse signal of the other signal, which configure the differential signal, from the wireless power receiving apparatus through the communication. The control unit 1311 may calculate a degree of the delay of at least one signal by using the received information on the delay. The control unit 1311 may make at least one signal be delayed by controlling the delay compensating circuit 1304 by using the degree of the delay. By the delay of at least one signal, a phase difference between the two signals that configure the differential signal may be adjusted to 180°.

Figure 14:
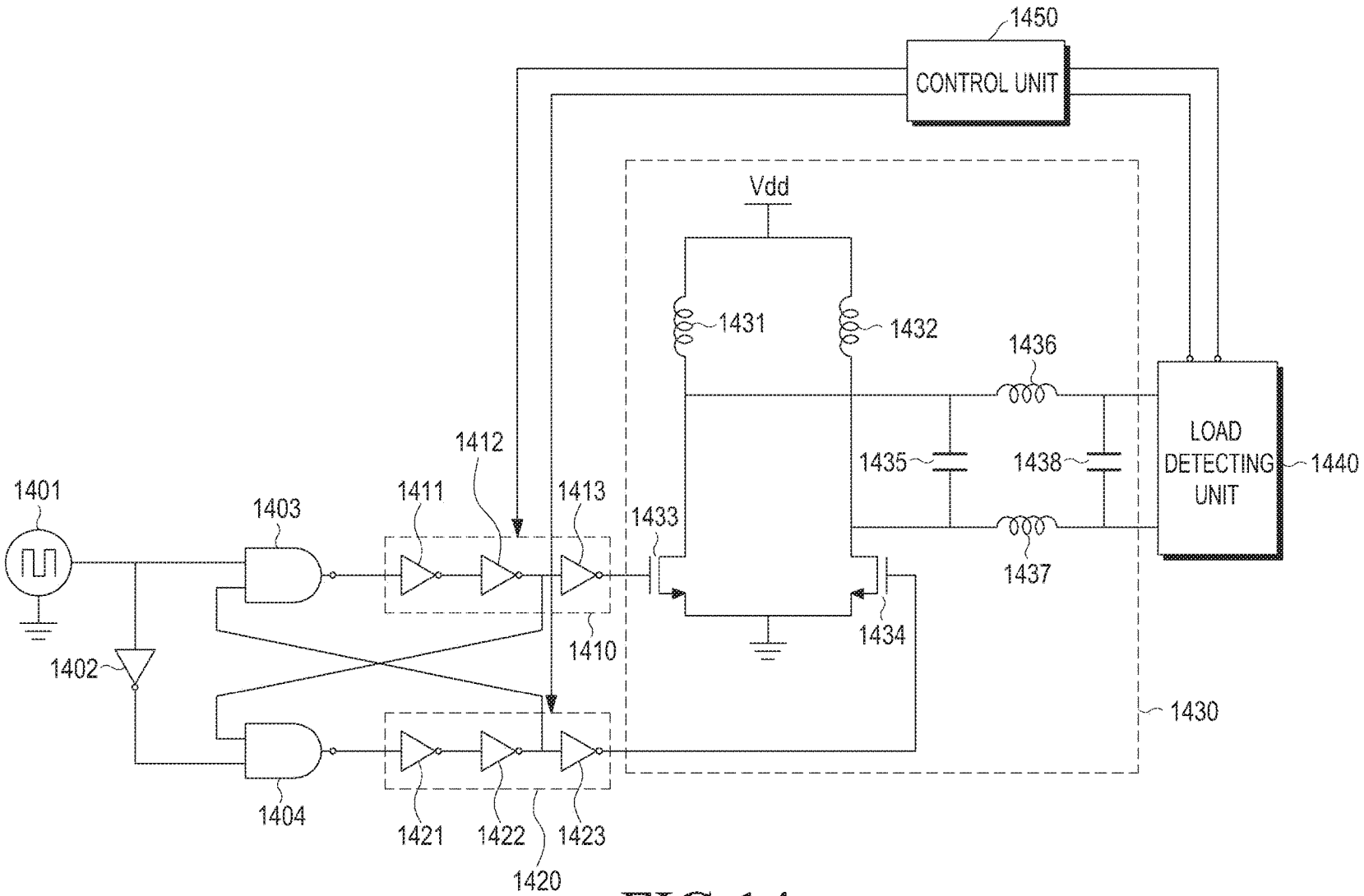
FIG. 14 illustrates a concept for describing a configuration of a wireless power transmitting apparatus according to various embodiments of the present disclosure.

FIG. 14 illustrates a concept for describing a configuration of a wireless power transmitting apparatus according to various embodiments of the present disclosure.

Referring to FIG. 14, the wireless power transmitting apparatus may include a power providing unit 1401, an inverter 1402, two NAND gates 1403 and 1404, delay compensating circuits 1410 and 1420, an amplifier 1430, a load detecting unit 1440, and a control unit 1450.

In various embodiments of the present disclosure, each of the delay compensating circuits 1410 and 1420 may include elements 1411, 1412, 1413, 1421, 1422, and 1423 capable of delaying an input signal. The control unit 1450 may calculate a delay between one signal and a reverse signal of the other signal, which configure a differential signal, by using at least one among a load, a voltage, and a current input from the load detecting unit 1440. The control unit 1450 may determine a signal to be delayed among the two signals that configure the differential signal by using the calculated delay. Further, the control unit 1450 may select a delay compensating circuit driven in response to the signal which is determined to be delayed, and determine the number of elements, which are capable of delaying the signal, to be driven and drive the determined number of elements.

The amplifier 1430 may include one or more coils 1431, 1432, 1436, and 1437, capacitors 1435 and 1438, and transistors 1433 and 1434, and may be implemented by, for example, a class D amplifier, but the kind of the amplifier 1430 is not limited.

In the meantime, in various embodiments of the present disclosure, the control unit 1450 may also receive information on the delay from the wireless power receiving apparatus through the communication unit. In this case, the control unit 1450 may determine a signal to be delayed among the two signals that configure the differential signal by using the received information on the delay. Further, the control unit 1450 may select a delay compensating circuit driven in response to the signal which is determined to be delayed, and determine the number of elements, which are capable of delaying the signal, to be driven and drive the determined number of elements.

Figure 15:
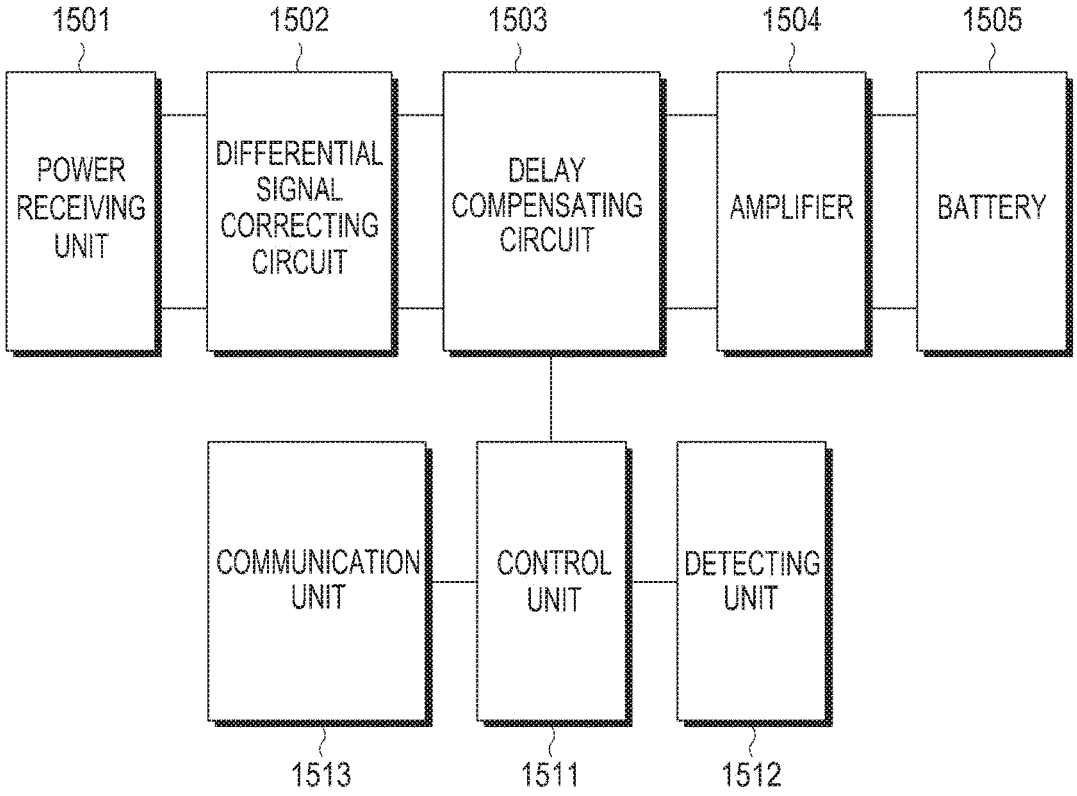
FIG. 15 is a block diagram illustrating a wireless power receiving apparatus according to various embodiments of the present disclosure.

FIG. 15 is a block diagram illustrating a wireless power receiving apparatus according to various embodiments of the present disclosure.

Referring to FIG. 15, the wireless power receiving apparatus may include a power receiving unit 1501, a differential signal correcting circuit 1502, a delay compensating circuit 1503, an amplifier 1504, a battery 1505, a control unit 1511, a detecting unit 1512, and a communication unit 1513.

The delay compensating circuit 1503 may compensate for a delay between two signals of a differential signal. For example, when a delay is generated between one signal and a reverse signal of the other signal, which configure the differential signal, the delay compensating circuit 1503 may delay at least one signal so that the delay is not generated between the one signal and the reverse signal of the other signal, which configure the differential signal. The delay compensating circuit 1503 compensates for the delay between the one signal and the reverse signal of the other signal, which configure the differential signal, so that a phase difference between the two signals that configure the differential signal may be adjusted to 180°.

The detecting unit 1512 may detect at least one of a load, a voltage, and a current at least one point of the wireless power transmitting apparatus. The control unit 1511 may calculate the delay between the one signal and the reverse signal of the other signal, which configure the differential signal, by using at least one detected among the load, the voltage, and the current detected by the detecting unit 1512. The control unit 1511 may calculate a degree of the delay of at least one signal by using the calculated delay. The control unit 1511 may make at least one signal be delayed by controlling the delay compensating circuit 1503 by using the degree of the delay. By the delay of at least one signal, a phase difference between the two signals that configure the differential signal may be adjusted to 180°.

In an embodiment of the present disclosure, the control unit 1511 may also transmit information on the calculated delay to the wireless power transmitting apparatus through the communication unit 1513. In this case, the control unit of the wireless power transmitting apparatus may delay at least one between the two signals, which configure the differential signal, by using the received information on the delay.

Each of the aforementioned elements of the wireless power transmitting apparatus or the wireless power receiving apparatus may be formed of one or more components, and the name of a corresponding element may be changed according to the kind of electronic apparatus. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "unit" as used herein may, for example, mean a unit including one of hardware, software, and firmware or a combination of two or more of them. The "unit" may be interchangeably used with, for example, the term "unit", "logic", "logical block", "component", or "circuit". The "unit" may be the smallest unit of an integrated component or a part thereof. The "unit" may be the smallest unit that performs one or more functions or a part thereof. The "unit" may be mechanically or electronically implemented. For example, the "module" according to the present disclosure may include at least one of an application-specific IC (ASIC) chip, a field-programmable gate arrays (FPGAs), and a programmable-logic device for performing operations which has been known or are to be developed hereinafter.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless power transmitting apparatus comprising:

[a] power providing circuitry configured to provide power;

a gate driver comprising circuitry configured to generate [a] differential [signal] *signals* comprising a first signal and a second signal using the power *to be* provided from the power providing circuitry;

[a] differential signal correcting circuitry [connecting] *connected to* the gate driver and an amplifier, wherein the differential signal correcting circuitry is configured to correct [the differential signal such that both of] the first signal and the second signal [are not outputted based on] *and to output, to the amplifier, the first signal to be corrected and the second signal to be corrected which does not* overlap [of] *with* the first signal [and the second signal] *to be corrected*;

the amplifier comprising circuitry configured to amplify [the] differential *signals to be corrected comprising the first signal to be corrected and the second* signal *to be corrected* by a predetermined gain; and

[a] power transmitting circuitry configured to receive the [amplified] differential [signal] *signals to be corrected and to be amplified* and [emit magnetic wave] *to output electromagnetic power* based on the [amplified] differential [signal] *signals to be corrected and to be amplified*.

2. The wireless power transmitting apparatus of claim 1, wherein the differential signal correcting circuitry includes:

a first NAND gate configured to receive the first signal through a first input terminal; and a second NAND gate configured to receive the second signal through a third input terminal.

3. The wireless power transmitting apparatus of claim 2, wherein an output terminal of the first NAND gate is connected to a fourth input terminal of the second NAND gate, and an output terminal of the second NAND gate is connected to a second input terminal of the first NAND gate.

4. The wireless power transmitting apparatus of claim 1, further comprising:

a delay compensating circuit configured to compensate for a delay between the first signal *to be corrected* and a reverse signal of the second signal *to be corrected*.

5. The wireless power transmitting apparatus of claim 4, further comprising:

[a] measuring circuitry configured to measure at least one of a load, a voltage, [and] *or* a current at one or more points of the wireless power transmitting apparatus; and

[a] control circuitry configured to determine the compensated delay by using at least one of the load, the voltage, [and] *or* the current.

6. The wireless power transmitting apparatus of claim 4, further comprising:

[a] control circuitry configured to:

receive information on the delay between the first signal *to be corrected* and the reverse signal of the second signal *to be corrected* from [the] *a* wireless power receiving apparatus, and control the delay compensating circuit so as to compensate for the delay between the first signal *to be corrected* and the reverse signal of the second signal *to be corrected* based on the received information.

7. A wireless power transmitting apparatus comprising:

[a] power providing circuitry configured to provide power;

a gate driver comprising circuitry configured to generate [a] differential *signals comprising a first signal and a second* signal [from] *using* the power *to be* provided from the power providing circuitry;

an amplifier comprising circuitry configured to amplify the differential [signal] *signals* by a predetermined gain;

[a] differential signal correcting circuitry [connecting] *connected to* the amplifier and [a] power transmitting circuitry, wherein the differential signal correcting circuitry is configured to correct the [amplified differential signal such that both of a] first signal *to be amplified* and [a] *the* second signal [that are included in the amplified differential signal are] *to be amplified and to output, to the power transmitting circuitry, the first signal to be corrected and the second signal to be corrected which does* not [outputted based on] overlap [of] *with* the first signal [and the second signal] *to be corrected*; and

[a] power transmitting circuitry configured to receive the [corrected] differential [signal] *signals to be corrected* and [emit magnetic wave] *output electromagnetic power* based on the [corrected] differential [signal] *signals to be corrected*.

8. The wireless power transmitting apparatus of claim 7, wherein the differential signal correcting circuitry includes:

a first NAND gate configured to receive the first signal through a first input terminal; and a second NAND gate configured to receive the second signal through a third input terminal.

9. The wireless power transmitting apparatus of claim 8, wherein an output terminal of the first NAND gate is connected to a fourth input terminal of the second NAND gate, and an output terminal of the second NAND gate is connected to a second input terminal of the first NAND gate.

10. The wireless power transmitting apparatus of claim 7, further comprising:

a delay compensating circuit configured to compensate for a delay between the first signal *to be corrected* and a reverse signal of the second signal *to be corrected*.

11. The wireless power transmitting apparatus of claim 10, further comprising:

[a] measuring circuitry configured to measure at least one of a load, a voltage, [and] *or* a current at one or more points of the wireless power transmitting apparatus; and

[a] control circuitry configured to determine the compensated delay by using at least one of the load, the voltage, [and] *or* the current.

12. The wireless power transmitting apparatus of claim 10, further comprising:

[a] control circuitry configured to:

receive information on the delay between the first signal *to be corrected* and the reverse signal of the second signal *to be corrected* from [the] *a* wireless power receiving apparatus, and control the delay compensating circuit so as to compensate for the delay between the first signal *to be corrected* and the reverse signal of the second signal *to be corrected* based on the [received] information.

13. A wireless power receiving apparatus wirelessly receiving power from a wireless power transmitting apparatus, the wireless power receiving apparatus comprising:

[a] power receiving circuitry configured to wirelessly receive the power from the wireless power transmitting apparatus;

a rectifier comprising circuitry configured to rectify [a] differential [signal] *signals* output from the power receiving circuitry*, the differential signals comprising a first signal and a second signal*;

a direct current to direct current (DC/DC) converter comprising circuitry configured to DC/DC convert the differential *signals to be rectified*; and

[a] differential signal correcting circuitry [connecting] *connected to* the power receiving circuitry and the rectifier, and [is] configured to correct the differential [signal such that both of a] *signals including the* first signal and [a] *the* second signal [that are included in the differential signal are] *which does* not [outputted based on] overlap [of] *with* the first signal[and the second signal].

14. The wireless power receiving apparatus of claim 13, wherein the differential signal correcting circuitry includes:

a first NAND gate configured to receive the first signal through a first input terminal; and a second NAND gate configured to receive the second signal through a third input terminal.

15. The wireless power receiving apparatus of claim 14, wherein an output terminal of the first NAND gate is connected to a fourth input terminal of the second NAND gate, and an output terminal of the second NAND gate is connected to a second input terminal of the first NAND gate.

* * * * *